US008677473B2

(12) United States Patent
Dennerline et al.

(10) Patent No.: US 8,677,473 B2
(45) Date of Patent: Mar. 18, 2014

(54) NETWORK INTRUSION PROTECTION

(75) Inventors: David Allen Dennerline, Sandy Springs, GA (US); Hubertus Franke, Cortlandt Manor, NY (US); David Paul LaPotin, Austin, TX (US); Terry Lee Nelms, II, Dallas, GA (US); Hao Yu, Valhalla, NY (US)

(73) Assignee: International Business Machines Corporation, Armonk, NY (US)

( * ) Notice: Subject to any disclaimer, the term of this patent is extended or adjusted under 35 U.S.C. 154(b) by 1135 days.

(21) Appl. No.: 12/273,142

(22) Filed: Nov. 18, 2008

(65) Prior Publication Data

US 2010/0125900 A1    May 20, 2010

(51) Int. Cl.
 G06F 9/00 (2006.01)
 H04L 29/06 (2006.01)
(52) U.S. Cl.
 CPC .............................. H04L 63/0227 (2013.01)
 USPC ......................................................... 726/13
(58) Field of Classification Search
 USPC ......................................................... 726/13
 See application file for complete search history.

(56) References Cited

U.S. PATENT DOCUMENTS

| 7,305,708 | B2 | 12/2007 | Norton et al. | |
| 7,769,851 | B1* | 8/2010 | Guruswamy et al. | 709/224 |
| 7,773,507 | B1* | 8/2010 | Kasralikar et al. | 370/230 |
| 2002/0032717 | A1* | 3/2002 | Malan et al. | 709/105 |
| 2003/0161311 | A1* | 8/2003 | Hiironniemi | 370/392 |
| 2006/0037077 | A1 | 2/2006 | Gadde et al. | |
| 2006/0075481 | A1 | 4/2006 | Ross et al. | |
| 2006/0217923 | A1* | 9/2006 | Ma et al. | 702/179 |
| 2006/0268866 | A1* | 11/2006 | Lok | 370/389 |
| 2007/0067841 | A1 | 3/2007 | Yegneswaran et al. | |
| 2007/0150574 | A1 | 6/2007 | Mallal et al. | |
| 2007/0286195 | A1 | 12/2007 | Ilnickl et al. | |
| 2007/0297333 | A1 | 12/2007 | Zuk et al. | |

(Continued)

FOREIGN PATENT DOCUMENTS

CN          1934597 A          3/2007

OTHER PUBLICATIONS

S. Li et al., "Improving a Network Security System by Reconfigurable Hardware," IEEE Proceedings in Norchip Conference, Nov. 2004, pp. 135-138.

(Continued)

*Primary Examiner* — Peter Shaw
(74) *Attorney, Agent, or Firm* — Jennifer R. Davis; Ryan, Mason & Lewis, LLP

(57) ABSTRACT

Improved techniques are disclosed for use in an intrusion prevention system or the like. For example, a method comprises the following steps performed by a computing element of a network. A packet of a flow is received, the flow comprising a plurality of packets, wherein the plurality of packets represents data in the network. A network intrusion analysis cost-benefit value is determined representing a benefit for analyzing the received packet for intrusions in relation to a cost for analyzing the received packet for intrusions. The method compares the network intrusion analysis cost-benefit value to a network intrusion analysis cost-benefit threshold value to determine whether analyzing the received packet for intrusions before forwarding the received packet is warranted. Responsive to a determination that analyzing the received packet for intrusions before forwarding the received packet is not warranted, the received packet is forwarded, an indication is made that subsequent packets of the flow should be forwarded, and a determination is made whether the received packet indicates an intrusion after forwarding the received packet.

21 Claims, 5 Drawing Sheets

(56) References Cited

U.S. PATENT DOCUMENTS

2007/0297410 A1    12/2007  Yoon et al.
2010/0329118 A1*   12/2010  Adams ........................ 370/235
2011/0016316 A1*    1/2011  Amir et al. ................... 713/168

OTHER PUBLICATIONS

U.S. Appl. No. 11/759,427, filed Jun. 7, 2007 and entitled "System, Method and Program Product for Intrusion Protection of a Network." Search Report for PCT/EP2009/064195 dated Jul. 30, 2010.

* cited by examiner

100

NETWORK INTRUSION PROTECTION

The present application is related to the U.S. patent application identified by Ser. No. 11/759,427, entitled "System, Method and Program Product for Intrusion Protection of a Network," filed on Jun. 7, 2007, the disclosure of which is incorporated by reference herein.

FIELD OF THE INVENTION

The invention relates generally to network security, and more specifically to an intrusion protection system which monitors incoming packets and flows in a computer network.

BACKGROUND OF THE INVENTION

A known Intrusion Prevention System ("IPS") with a SNORT™ intrusion analysis engine or Internet Security System PAM™ intrusion analysis engine can be interposed between network segments. For example, the IPS can be installed in a firewall or gateway of a computer network. The IPS can analyze incoming message packets for intrusions, such as viruses and worms ("malware"), attempted exploitation of vulnerabilities such as buffer overflows, violations of network policy, and/or denial of service attacks. If the IPS detects an intrusion in a packet, the IPS can automatically block/drop the packet, block the flow associated with the packet, and/or notify an administrator. The administrator can further analyze the notification details, and if he or she determines that the notification is associated with an intrusion, may change the configuration of a firewall to block the intruder, report the event to the authorities, gather forensic evidence, clean any compromised hosts, and/or contact the administrator of the network that was the source of the attack.

Occasionally, the rate of incoming packets is greater than the IPS can process them (i.e., analyze them for intrusions). In such a case, the IPS can either drop or pass the excess packets which it cannot process. If the packet is not malicious but is dropped (without analysis) due to the overload, this may represent a loss of important data, request or other communication. If the packet is malicious but is allowed to pass through the IPS (without analysis) due to overload, this may harm a device on the destination network. To mitigate the risk, there may be a firewall between the IPS and the destination network that will block some potentially malicious packets. The firewall will block the packet if the packet does not match a permitted flow, i.e., combination of source IP address, source port, destination IP address, destination port and protocol, but may not analyze the packet for viruses or worms or detect an attempted exploitation of vulnerabilities or denial of service attack.

SUMMARY OF THE INVENTION

Embodiments of the invention provide improved techniques for use in a network intrusion prevention system or the like.

For example, in one embodiment, a method comprises the following steps performed by a computing element of a network. A packet of a flow is received, the flow comprising a plurality of packets, wherein the plurality of packets represents data in the network. A network intrusion analysis cost-benefit value is determined representing a benefit for analyzing the received packet for intrusions in relation to a cost for analyzing the received packet for intrusions. The method compares the network intrusion analysis cost-benefit value to a network intrusion analysis cost-benefit threshold to determine whether analyzing the received packet for intrusions before forwarding said received packet is warranted. Responsive to a determination that analyzing the received packet for intrusions before forwarding the received packet is not warranted, the received packet is forwarded, an indication is made that subsequent packets of the flow should be forwarded, and a determination is made whether the received packet indicates an intrusion after forwarding the received packet.

Further, responsive to a determination that the analyzing the received packet for intrusions before forwarding the received packet is warranted, a determination may be made as to whether the received packet indicates an intrusion and, responsive to a determination that the received packet does not indicate an intrusion, the received packet may be forwarded.

Still further, responsive to a determination that the received packet indicates an intrusion, the received packet may be discarded and an indication may be made that subsequent packets of the flow should be discarded.

These and other objects, features, and advantages of the present invention will become apparent from the following detailed description of illustrative embodiments thereof, which is to be read in connection with the accompanying drawings.

DETAILED DESCRIPTION OF PREFERRED EMBODIMENTS

While illustrative embodiments of the invention will be described below in the context of a particular intrusion prevention system (IPS), it is to be understood that principles of the invention are not limited to the particular IPS architecture illustratively described, but rather are more generally applicable in any intrusion prevention, protection and/or detection system. For ease of reference, we will generally refer to any such system as an intrusion prevention system or simply an IPS.

Principles of the invention will now be described as follows. In Section I, we will describe illustrative embodiments of an IPS as disclosed in the above-referenced U.S. patent application identified as Ser. No. 11/759,427. We will then, in Section II, describe alternate illustrative embodiments that address other issues that can arise with respect to an IPS.

I. Illustrative IPS Management

Figure 1:
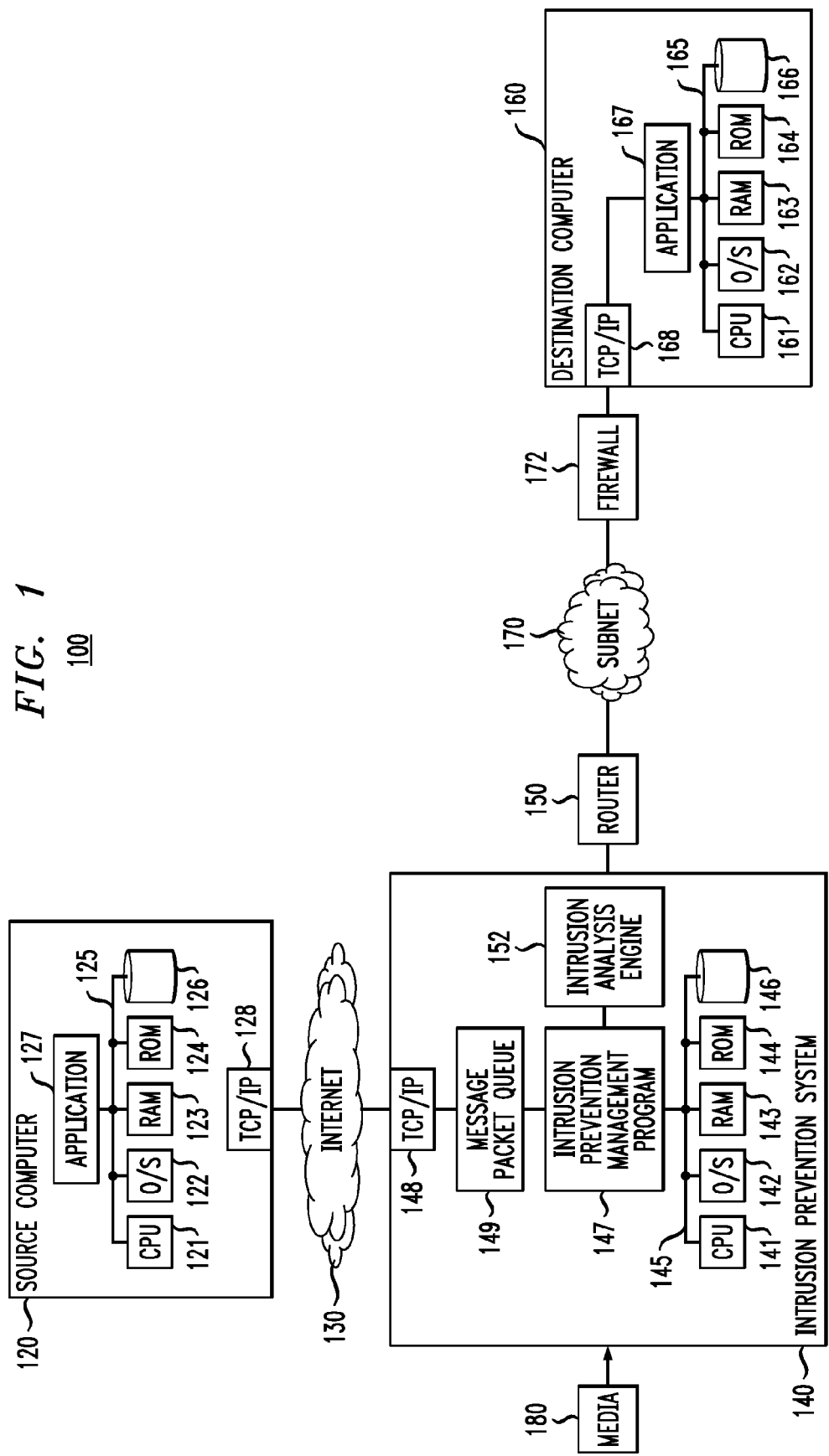
FIG. 1 illustrates a distributed computer system including an intrusion prevention system in which principles of the invention may be implemented.

FIG. 1 illustrates a distributed computer system (network) generally designated 100 in which principles of the invention are incorporated. A source computer 120 includes a central processing unit (CPU) 121, operating system (O/S) 122, random access memory (RAM) 123 and read only memory (ROM) 124 on a bus 125, a storage 126 and TCP/IP adapter card 128 for Internet 130. Source computer 120 also includes an application 127 which generates data, requests or other messages addressed to a destination subnet 170 or destination computer 160. Source computer 120 is coupled to subnet 170 via an untrusted network 130 (such as the Internet) and an intrusion prevention system ("IPS") 140, according to principles of the invention. IPS 140 can reside in a computing element of the network such as a firewall or gateway device for subnet 170 or reside in a computing element of the network interconnected "in-line" between the network 130 and a router 150 for a subnet 170 as shown in FIG. 1. Destination computer 160 includes a CPU 161, operating system 162, RAM 163 and ROM 164 on a bus 165, a storage unit 166 and a TCP/IP adapter card 168. Destination computer 160 also includes an application 167 which processes data, requests or other messages sent by source computer 120 (and other source devices not shown). IPS 140 includes a CPU 141, operating system 142, RAM 143 and ROM 144 on a bus 145 and a storage unit 146.

As heretofore noted, embodiments of the invention may be implemented in one or more computers, such as source computer 120, IPS 140 and/or destination computer 160, in conjunction with a computer-readable storage medium or other computer program product. In such implementations, an application program (e.g., application 127, program 147, intrusion analysis engine 152 or application 167), or software components thereof, including instructions or code for performing the methodologies of the invention, as described herein, may be stored on one or more associated storage devices (e.g., ROM 124, 144 or 164 and/or storage units 126, 146 or 166) and, when ready to be utilized, loaded in whole or in part (e.g., into RAM 123, 143 or 163) and executed by one or more processors (e.g., CPUs 121, 141 or 161).

Source computer 120 also includes an intrusion analysis engine 152 (implemented in software and/or hardware) which analyzes incoming packets to detect and block intrusions such as viruses, worms, or other packets which attempt to exploit a vulnerability in the destination computer or cause denial of service attacks. Intrusion analysis engine 152 can also block messages with unwanted content such as pornography and/or spam.

For example, a known SNORT™ intrusion analysis engine detects intrusions in packets based on signatures or other patterns of bits in each packet.

By way of further example, a known Internet Security System PAM™ intrusion analysis engine detects intrusions in packets based on signatures and patterns, vulnerable host simulation, known malicious behavior, traffic anomalies, protocol anomalies and other types of exploits. PAM™ intrusion analysis engine determines and emulates the state of the application at both the requesting computer and the destination device, and determines if the current packet will exploit a known vulnerability in the destination computer. For example, if the destination device is a web/HTTP (Hypertext Transport Protocol) server and the TCP stream contains a Uniform Resource Locator (URL) that is longer than the URL buffer size of the web server, PAM™ intrusion analysis engine considers this to be an attempted exploit of the vulnerability by the requester because it will cause a buffer overflow in the web server. As another example, if the destination device is a web/HTTP server, the requester makes a request and the web server responds with an Hypertext Markup Language (HTML) web page with an excessively long tag, PAM™ intrusion analysis engine considers this to be an attempted exploit of the vulnerability by the web server because it will cause a tag buffer overflow in the requester's web browser. PAM™ intrusion analysis engine also detects unusual network traffic presumed to be malicious such as a remote Microsoft Windows shell request, unauthorized attempts to access a root directory or Standard Query Language (SQL) injection of SQL requests in data fields. PAM™ intrusion analysis engine also detects unusual or unnecessary encryption, obfuscation or other techniques to obscure intrusions. PAM™ intrusion analysis engine also detects traffic anomalies such as unusual network mapping including attempts to identify open ports with an unusual large number of connection requests.

IPS 140 also includes an intrusion prevention management program 147 (implemented in hardware and/or software) according to the principles of the invention which determines a composite score for each incoming message packet based on various factors. The higher the composite score the greater the projected or likely benefit/cost ratio for analysis by the intrusion analysis engine 152. One potential benefit is detection of intrusions. The cost can be the time/burden to analyze the packet for intrusions. By way of example, the composite score is based on the following benefit and cost factors:

(a) Protocol type. If a protocol has more associated vulnerabilities or higher risk vulnerabilities, there will be greater likely benefit to analyzing a packet with such a protocol, and therefore a higher composite score. The weight of this factor is based on the number and severity of the known and likely vulnerabilities for each protocol.

(b) Customer preferences for analyzing certain types of packets addressed to specific destination devices that the customer may consider to be very important or sensitive. If the customer has indicated that specific destination devices are very important and/or sensitive, this will raise the composite score for a packet addressed to such a destination device because the benefit will be higher. The weight of this factor is based on the importance and/or sensitivity of the destination device.

(c) Whether IPS 140 or intrusion analysis engine 152 is able to analyze the packet. If not, then the composite score is lower.

(d) Whether the destination computer includes an intrusion analysis engine of its own. If so, the composite score will be lower because IPS 140 is partially or completely redundant, and the benefit is not so great for conducting the intrusion analysis in IPS 140. The weight of this factor is based on the effectiveness of the intrusion analysis engine at the destination computer, if any.

(e) Whether the packet contains a payload or is just an acknowledgment (without a payload). If there is no payload, then the composite score will be reduced because there is no application protocol contained in the packet and the benefit for conducting the intrusion analysis is low. For example, if the packet is a TCP acknowledgment packet but does not contain a payload, there is little chance that the packet is attempting to exploit a vulnerability in the destination device.

(f) Whether the packet is structured to hinder detection by the IPS. If so, the benefit of an intrusion analysis is increased because it is more likely that the packet is an intrusion.

(g) The byte count of the entire flow associated with the current packet. If the byte count for the flow is large, this will lower the composite score except for protocols and file types where the exploit may readily or likely occur later in the session.

(h) Whether the intrusion analysis engine 152 knows the current state of a state-based flow. If not, then program 147 will lower the composite score for the current packet on the flow because program 147 cannot effectively evaluate the current packet so there is lower benefit of an intrusion analysis.

The weight of each factor reflects the degree to which the factor affects the benefit/cost of conducting the intrusion analysis. The lower the composite score, the lower the benefit/cost ratio for completely analyzing the packet by intrusion analysis engine 152. If the composite score is below an applicable threshold for composite score, then program 147 will automatically pass the packet to the next hop en route to the destination computer without analysis by the intrusion analysis engine 152. This may be referred to as "fast-forwarding" the packet. However, if the composite score is greater than or equal to the applicable threshold for composite score, then program 147 notifies intrusion analysis engine 152 to completely analyze the packet.

For example, each of the aforementioned criteria (a) to (h) can be represented by a function of the packet P such that A(P) . . . H(P) yield a value. A composite value CV(P) is then computed, for instance, by the formula CV(P)=A(P)+ B(P)+ . . . +H(P). Dependent on the criticality of each of these criteria, the individual functions might return a value in different ranges. Alternatively, a composite value can be determined through a decision tree of evaluating various criteria. One skilled in the art will understand that, given a set of criteria of different importance, there are many ways to derive a single composite value and that utilization of these different methods is in the spirit of this invention.

If intrusion analysis engine 152 detects malicious behavior or otherwise determines a high risk associated with the packet, then intrusion analysis engine 152 will drop the packet. Otherwise, intrusion analysis engine 152 will notify program 147 that the packet is not malicious. In response, program 147 will forward the packet to router 150 to route according to a known routing algorithm to the next hop en route to the destination subnet 170 or destination computer 160. The determination of the composite score for each packet takes a much shorter time than would be required by intrusion analysis engine 152 to analyze the packet for intrusions. This allows a greater throughput for IPS 140 and alleviates overload of IPS 140.

In addition to determining the composite score for each packet, if intrusion analysis engine 152 finds a malicious packet on a flow, then program 147 will automatically block/discard all subsequently received packets on the same flow. This has a similar effect as assigning the highest composite score for such a packet, but does not require program 147 to compute the composite score.

Program 147 also dynamically adjusts the threshold for the composite score based on the rate of incoming packets compared to the rate that IPS 140 can process them. If the rate of incoming packets is greater than the rate at which IPS 140 (including program 147 and intrusion analysis engine 152) can process them, then program 147 will increase the threshold for composite score so that (statistically) more packets will pass through IPS 140 without a complete, time-consuming analysis by intrusion analysis engine 152. This will reduce the backlog in IPS 140 and allow IPS 140 to keep up with the rate of incoming packets. Conversely, if the rate of incoming packets is significantly lower than the rate at which IPS 140 (including program 147 and analysis engine 152) can process them, then program 147 will decrease the threshold for composite score so that (statistically) more packets will be analyzed by intrusion analysis engine 152. This will increase security without overloading IPS 140.

Figure 2:
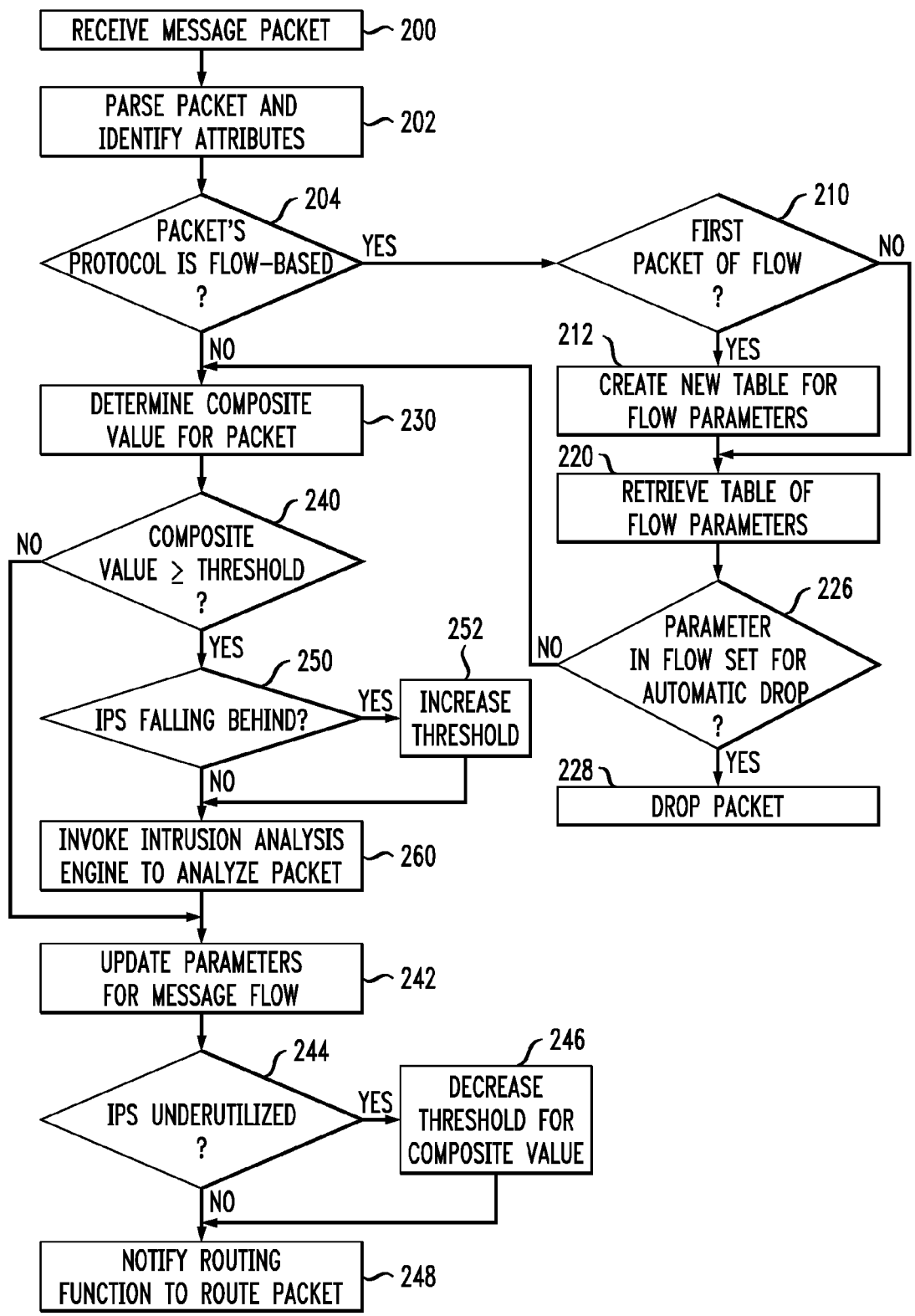
FIG. 2 illustrates an intrusion prevention management methodology for use by the intrusion prevention management function in FIG. 1.

FIG. 2 illustrates function and operation of intrusion prevention management program 147 and associated functions in more detail. In step 200, IPS 140 receives a packet and buffers the packet awaiting processing by program 147. In response, program 147 parses the packet and identifies attributes of the packet relevant to determining the composite score or whether the packet should automatically be dropped. These attributes comprise the specific Open System Interconnection (OSI) layer 3 protocol of the packet, the specific OSI layer 4 protocol of the packet, whether IP fragmentation field is set for TCP, whether the packet is merely an acknowledgment without a payload, whether the packet is encrypted, and the identity of the flow associated with the packet (step 202). Program 147 determines the layer 3 protocol based on the type field in the data link protocol's header (e.g., the type field in the Ethernet header). Program 147 determines the OSI layer 4 protocol based on the protocol field in the network protocol's header (e.g., IPv4's protocol field). The IP fragmentation field is located at a known location in the packet header based on the type of protocol. Program 147 determines whether the packet is merely an acknowledgment without a payload based on the total length of the packet specified in the IP header. The source IP address, source port, destination IP address, destination port, OSI layer 4 protocol, and optionally the Virtual Local Area Network (VLAN) identifier (ID) attributes identify the flow of which this packet is part. Program 147 performs step 202 without initiating intrusion analysis of the packet, i.e., without analyzing the packet for signatures or patterns of intrusion, or other characteristics of an attempted exploit or denial of service attack, such as provided by ISS PAM™ intrusion analysis engine as described above.

Next, program 147 determines if this packet has a flow-based protocol, i.e., a protocol which involves a two-directional communication (decision 204). Typically, a two-directional communication includes a setup of the communication, a request, a response and a closure of the communication. Examples of flow-based protocols are TCP, User Datagram Protocol (UDP) when the application layer is flow based, and Stream Control Transport Protocol (SCTP). Other protocols such as Address Resolution Protocol (ARP) and Internet Control Message Protocol (ICMPv6) are not flow-based, and are typically used for broadcast and/or one-way communications such as address resolution or error reporting. As described in more detail below, for flow-based protocols, program 147 determines the composite score for packets in the same flow (or whether to automatically drop subsequently received packets in the same flow) based in part on other, previously received packets in the same flow. If the packet is flow-based (decision 204, yes branch), then program 147 determines if this is the first packet in the associated flow (decision 210). If the packet's protocol is flow-based and this is the first packet in the flow (decision 210, yes branch), then program 147 defines a new flow with default attributes for the protocol (step 212).

By way of example, the default attributes for a TCP flow can comprise byte count of zero (meaning that at this time no bytes on this flow have been analyzed), source IP address and port, destination IP address and port, protocol type, number of packets in this flow dropped equal zero (meaning that at this time no bytes of the flow have been dropped), a flag indicating that this flow is not blocked at this time, whether either of the end nodes has an intrusion analysis engine, and the customer's preference for heightened composite score/security in either end node. The default attributes for UDP can be the same as TCP. If this is a second or subsequent packet received in a flow-based message (decision 210, no branch), then program 147 fetches the flow definition associated with this packet (step 220). The flow definition was defined in a previous iteration of decision 210 and step 212.

Next, program 147 checks the attribute values for the flow to determine (decision 226) if this message flow is indicated to be automatically dropped without further evaluation (step 228). For example, if a prior packet in the same flow was determined by the analysis engine 152 to be malicious (decision 226), then all of the subsequently received packets in the same flow will automatically be dropped (step 228). If so (decision 226, yes branch), then program 147 drops the packet (step 228). If not (decision 226, no branch), then program 147 determines a composite score for the packet (step 230). The composite score is based on the projected or likely benefit/cost ratio as described above.

Refer again to decision 204, no branch, where the packet's protocol is not flow-based. In such a case, program 147 proceeds directly from decision 204 to step 230 to determine the composite score for the packet, as described above.

After step 230, program 147 compares the composite score of the packet to a current threshold for composite score (step 240). If the composite score is less than the current threshold (decision 240, no branch), then program 147 does not initiate intrusion analysis of the packet, and instead updates the flow attributes for the associated message (step 242). For example, in step 242, program 147 updates the number of bytes of the message which have been received without detecting an intrusion.

Next, program 147 determines if the current rate of incoming packets is below a lower packet-rate-threshold (decision 244). Program 147 determines the current rate of incoming packets by the number of queued packets. If the current rate of incoming packets is below the lower packet-rate-threshold (decision 244, yes branch), then program 147 lowers the current threshold for the composite score (step 246). By lowering the current threshold for the composite score, statistically more subsequent packets will exceed the threshold and be analyzed by intrusion analysis engine 152. While this will slow down IPS 140, it will increase security and can be accommodated by IPS 140. Under current conditions for types of incoming packets, IPS 140 can analyze more incoming packets and still keep pace with the incoming packets. If the current rate of incoming packets is greater than or equal to the lower packet-rate-threshold (decision 244, no branch), then program 147 does not lower the current threshold for composite value.

Next, program 147 passes the packet to router 150 to route the unanalyzed packet to the next hop according to the port on which the packet entered the system and the known routing protocol of the router. This is considered "fast-forwarding" of the packet. In the illustrated example, the next hop is subnet 170. In response, router 150 determines the next hop and forwards the unanalyzed packet to firewall 172 (or other gateway) to subnet 170. After checking the destination IP address, application identifier or other destination indicia contained in the packet's header, firewall (or other gateway) 172 forwards the packet to destination computer 160.

Refer again to decision 240, yes branch, where the composite score of the packet is greater than or equal to the current threshold for composite score. In such a case, program 147 determines if the rate of incoming packets is greater than a rate at which IPS 140 (including program 147 and intrusion analysis engine 152) can process them (decision 250). Program 147 makes this determination by counting the number of packets which have accumulated in packet cache 149 awaiting processing by program 147. If the number of accumulated packets in packet cache 149 awaiting processing is above a predetermined threshold (or if the cache 149 is filled above a predetermined percentage of its capacity) (decision 250, yes branch), then program 147 increases the threshold for the composite score (step 252). If so, statistically, program 147 will subsequently pass more packets through IPS 140 to the destination device without a time-consuming analysis by intrusion analysis engine 152. This will reduce the processing time in IPS 140 and therefore, reduce the backlog in IPS 140 and allow IPS 140 to keep up with the current rate of incoming packets. Because the composite score was found in decision 240 to be above the threshold for composite score, program 147 notifies intrusion analysis engine 152 to analyze the packet for intrusions (step 260). Step 260 follows step 252 as well as decision 250, no branch where IPS 140 is keeping up with the rate of incoming packets and does not increase the threshold for composite score.

In response to the notification from program 147, intrusion analysis engine 152 analyzes the packet for intrusions in a known manner as described above. Next, program 147 updates the packet's flow attributes, as described above (step 242). Next, program 147 proceeds to decision 244-248, as described above.

Intrusion Prevention Management program 147, to the extent it is implemented in software, can be loaded into IPS computer 140 from a computer readable storage media 180 such as magnetic disk or tape, optical media, DVD, memory stick, etc. or downloaded from the Internet 130 via TCP/IP adapter card 148.

Intrusion analysis engine 152, to the extent it is implemented in software, can be loaded into IPS computer 140 from computer readable storage media 180 such as magnetic disk or tape, optical media, DVD, memory stick, etc. or downloaded from the Internet 130 via TCP/IP adapter card 148.

II. Alternate IPS Management

As mentioned above, dependent on the system, the IPS can take substantial time to inspect individual packets. This in turn can lead to delays of packets through the IPS that can have adverse affects, such as jitter on a Voice over Internet Protocol (VoIP) phone call. Therefore, IPSs often set maximum delays to avoid such adverse affects. Once a packet has reached its maximum delay in the system (for instance, due to queuing), the packet is either dropped or so called fast-forwarded, i.e., the packet is allowed to pass without completion or commensuration of the packet inspection, as explained above. Under certain circumstances, this may be in contrast to the main objective of the IPS, namely to inspect every packet.

Also as mentioned above, state of the art IPSs maintain state about connections that are setup for instance by TCP/IP connections and attempt to deduce as much as possible about the endpoints, then they emulate the software stacks at the endpoints and attempt to narrow down known exploits at said endpoints. We refer to connections of this nature as flows. For instance, the entire content of a webpage can be inspected for potential violations such as tag mismatches. Web pages are transferred as a sequence of packets, and it is desirable to identify intrusions as soon as possible. In such scenarios, if even a single packet of this flow is not inspected, then the entire subsequent sequence of packets cannot be inspected due to the loss of the previous content or the lack of state that is associated with inspecting this single packet, which was already forwarded to ensure the maximum latency requirement. This in turn can substantially increase the number of uninspected packets that pass through the system. The situation is further exasperated by the fact that packets often arrive in bursts due to the properties of the TCP/IP protocol and potential delays can effectively be defined by the sum of the processing times for all packets of a burst as stateful inspection requires serialized inspection of a sequence of packets on the same flow.

It would therefore be advantageous to provide techniques that increase the packet inspection rate without a significant drop in the quality of service parameter (max delay).

Illustrative embodiments of the invention described in here Section II provide such improved techniques by extending the above described IPS management techniques described in Section I.

In Section I, a main concept is to stop inspecting packets on a flow for which confidence exists, referred to as fast-forwarding. This technique is deployed to enable to deal with oversubscription even if temporary. A main concept in the embodiments of Section II is that such identified fast forwarded packets continue to be inspected, cycles permitting, and allow the IPS to catch up with the inspection and thus restore a fast forwarded flow back into full inspection mode. We refer to this as a "catch-up" mode. As a result, potential threats can be continuously assessed. Accordingly, the alternate system provides a higher degree of inspection and hence a higher insurance against potential intrusion threats.

Thus, in Section II, we provide a mechanism to de-prioritize packets that are inspected in this "catch-up" mode to allow new traffic to be processed. Such mechanism can be implemented in the composite scoring feature described above (described in FIGS. 1 and 2), for instance, by lowering the flow score if the system is in catch-up mode.

The mechanism of this alternate embodiment further enables the above system to selectively disable certain inspection features (heuristics) in order to free system resources at the cost of quality of service (QoS). The alternate embodiment also provides a mechanism to obviscate and/or randomize the mechanism for heuristics selection over time and on the same flow such that any attacker will not be able identify and exploit specific deselected heuristics. It also provides a mechanism to project the benefits of enabling said catch-up mode over the fast-forward mode.

Without loss of generality, principles of the invention are illustrated on the principal definitions of the OSI-7 reference model. Those skilled in the art will fully appreciate that other communication stack models are covered under this invention as well.

For further explanation, we divide the Intrusion Analysis Engine into a front end and a back end. The front end is that part of the inspection that can be accomplished either in parallel or out of order for a set of packets potentially belonging to the same flow; this is typically to OSI layer 4 or TCP/IP. The back end is typically that part of the analysis that must be serialized for intra flow packets. Hence, the front end receives the network packets, extracts the TCP/IP 5 tuple (source IP address/port, destination IP address/port, and OSI layer 4 protocol) and determines the flow associated with this tuple. The flow maintains all the required state to resume flow inspection when the next packet on the flow arrives. The packets and their respective flows are scored based on various techniques to identify potential threats. In the case of the back end being unable to keep up with the packet load, packet and flows scores are compared against an actively maintained cut-off score. Based on their threat-score, selected packets are either dropped (high threat), or fast forwarded (low threat) in order to ensure continued inspection for unknown and newly arriving connections.

Figure 3:
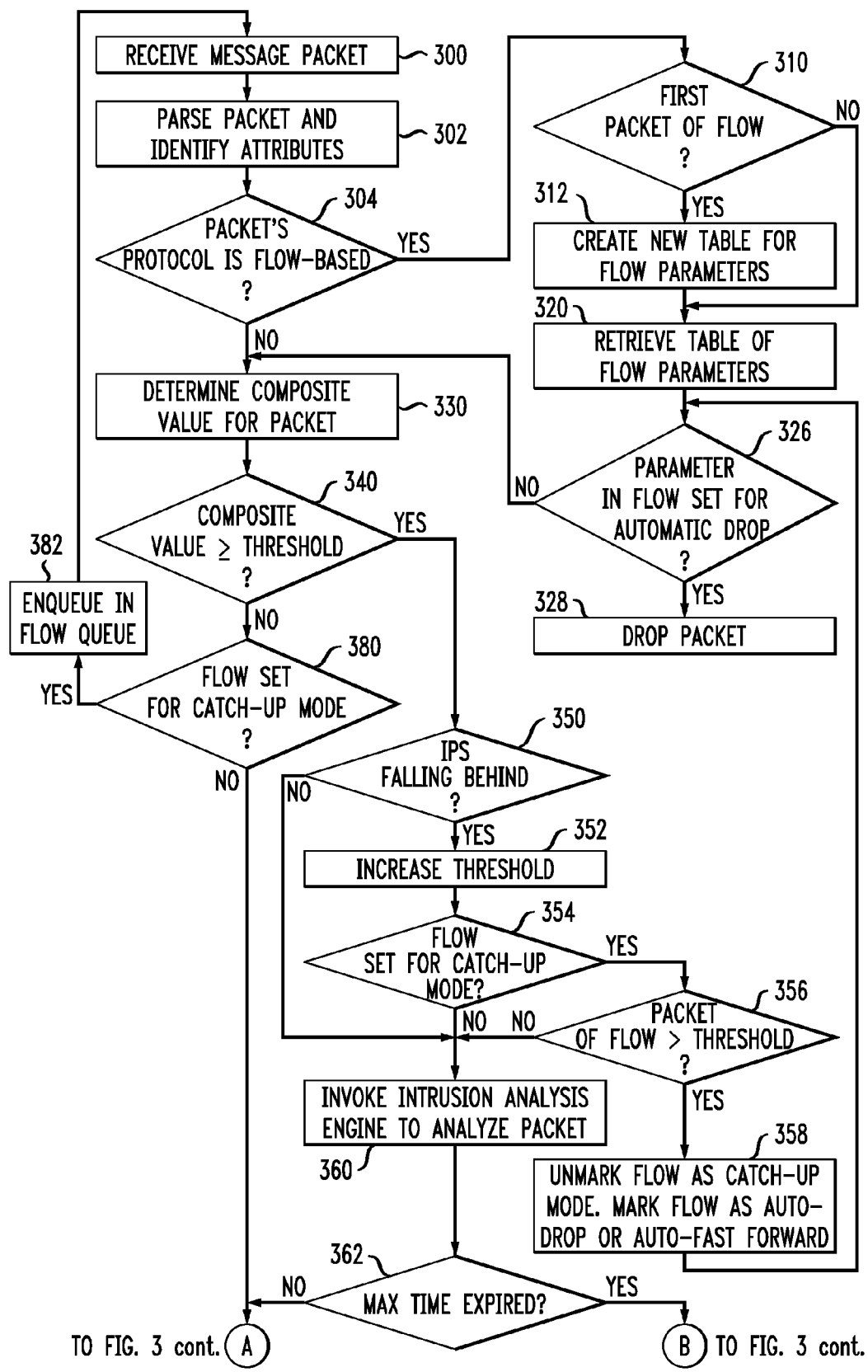
FIG. 3 illustrates an intrusion prevention management methodology with a catch-up mode for use by the intrusion prevention management function in FIG. 1.
Figure 3:
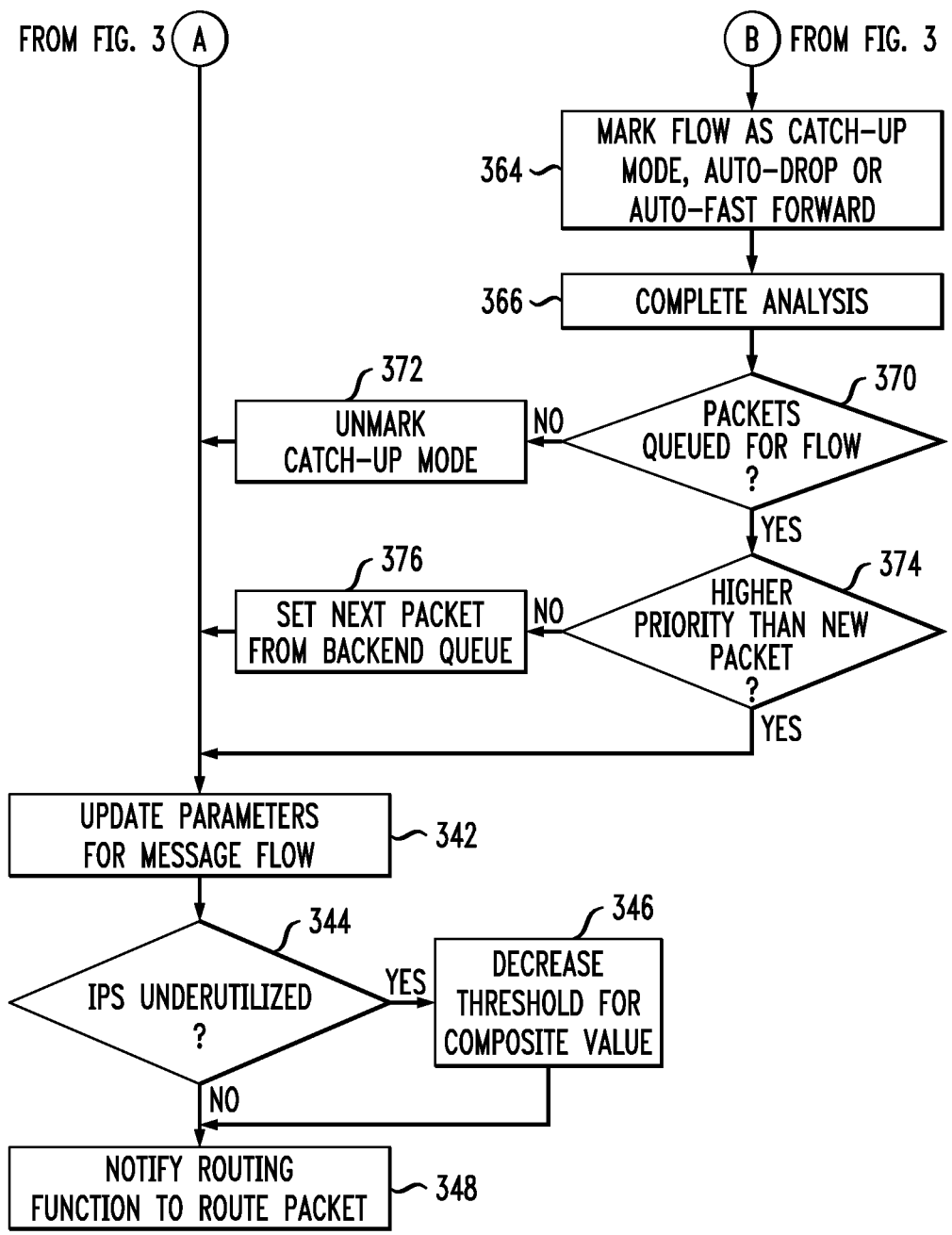

FIG. 3 illustrates function and operation of intrusion prevention management program 147 and associated functions according to this embodiment in more detail. In step 300, IPS 140 receives a packet either from the frontend (network) queue or the backend (flow) queue. IPS 140 buffers the packet awaiting processing by program 147. In response, program 147 parses the packet and identifies attributes of the packet relevant to determining the composite score or whether the packet should automatically be dropped. These attributes comprise the specific Open System Interconnection (OSI) layer 3 protocol of the packet, the specific OSI layer 4 protocol of the packet, whether IP fragmentation field is set for TCP, whether the packet is merely an acknowledgment without a payload, whether the packet is encrypted, and the identity of the flow associated with the packet (step 302). Program 147 determines the layer 3 protocol based on the type field in the data link protocol's header (e.g., the type field in the Ethernet header). Program 147 determines the OSI layer 4 protocol based on the protocol field in the network protocol's header (e.g., IPv4's protocol field). The IP fragmentation field is located at a known location in the packet header based on the type of protocol. Program 147 determines whether the packet is merely an acknowledgment without a payload based on the total length of the packet specified in the IP header. The source IP address, source port, destination IP address, destination port, OSI layer 4 protocol, and optionally the Virtual Local Area Network (VLAN) identifier (ID) attributes identify the flow of which this packet is part. Program 147 performs step 302 without initiating intrusion analysis of the packet, i.e., without analyzing the packet for signatures or patterns of intrusion, or other characteristics of an attempted exploit or denial of service attack, such as provided by the ISS PAM™ intrusion analysis engine as described above.

Next, program 147 determines if this packet has a flow-based protocol, i.e., a protocol which involves a two-directional communication (decision 304). Typically, a two-directional communication includes a setup of the communication, a request, a response and a closure of the communication. Examples of flow-based protocols are TCP, User Datagram Protocol (UDP) when the application layer is flow based, and Stream Control Transport Protocol (SCTP). Other protocols such as Address Resolution Protocol (ARP) and Internet Control Message Protocol (ICMPv6) are not flow-based, and are typically used for broadcast and/or one-way communications such as address resolution or error reporting. As described in more detail below, for flow-based protocols, program 147 determines the composite score for packets in the same flow (or whether to automatically drop subsequently received packets in the same flow) based in part on other, previously received packets in the same flow. If the packet is flow-based (decision 304, yes branch), then program 147 determines if this is the first packet in the associated flow (decision 310). If the packet's protocol is flow-based and this is the first packet in the flow (decision 310, yes branch), then program 147 defines a new flow with default attributes for the protocol (step 312).

By way of example, the default attributes for a TCP flow can comprise byte count of zero (meaning that at this time no bytes on this flow have been analyzed), source IP address and port, destination IP address and port, protocol type, number of packets in this flow dropped equal zero (meaning that at this time no bytes of the flow have been dropped), a flag indicating that this flow is not blocked at this time, whether either of the end nodes has an intrusion analysis engine, and the customer's preference for heightened composite score/security in either end node. The default attributes for UDP can be the same as TCP. If this is a second or subsequent packet received in a flow-based message (decision 310, no branch), then program 147 fetches the flow definition associated with this packet (step 320). The flow definition was defined in a previous iteration of decision 310 and step 312.

Next, program 147 checks the attribute values for the flow to determine (decision 326) if this message flow is indicated to be automatically dropped without further evaluation (step 328). For example, if a prior packet in the same flow was determined by the analysis engine 152 to be malicious (decision 326), then all of the subsequently received packets in the same flow will automatically be dropped (step 328). If so (decision 326, yes branch), then program 147 drops the packet (step 328). If not (decision 326, no branch), then program 147 determines a composite score for the packet (step 330). The composite score is based on the projected or likely benefit/cost ratio as described above.

Refer again to decision 304, no branch, where the packet's protocol is not flow-based. In such a case, program 147 proceeds directly from decision 304 to step 330 to determine the composite score for the packet, as described above.

After step 330, program 147 compares the composite score of the packet to a current threshold for composite score (step 340). If the composite score is less than the current threshold (decision 340, no branch), then program 147 does not initiate intrusion analysis of the packet. Rather, program 147 determines whether the flow is set for catch-up mode (decision 380). If so (decision 380, yes branch), the flow is enqueued in the backend queue (step 382) and another message packet is received (step 300). If the flow is not set for catch-up mode (decision 380, no branch), program 147 instead updates the flow attributes for the associated message (step 342). For example, in step 342, program 147 updates the number of bytes of the message which have been received without detecting an intrusion.

Next, program 147 determines if the current rate of incoming packets is below a lower packet-rate-threshold (decision 344). Program 147 determines the current rate of incoming packets by the number of queued packets. If the current rate of incoming packets is below the lower packet-rate-threshold (decision 344, yes branch), then program 147 lowers the current threshold for the composite score (step 346). By lowering the current threshold for the composite score, statistically more subsequent packets will exceed the threshold and be analyzed by intrusion analysis engine 152. While this will slow down IPS 140, it will increase security and can be accommodated by IPS 140. Under current conditions for types of incoming packets, IPS 140 can analyze more incoming packets and still keep pace with the incoming packets. If the current rate of incoming packets is greater than or equal to the lower packet-rate-threshold (decision 344, no branch), then program 147 does not lower the current threshold for composite value.

Next, program 147 passes the packet to router 150 to route the unanalyzed packet to the next hop according to the port on which the packet entered the system and the known routing protocol of the router. This is considered "fast-forwarding" of the packet. In the illustrated example, the next hop is subnet 170. In response, router 150 determines the next hop and forwards the unanalyzed packet to firewall 172 (or other gateway) to subnet 170. After checking the destination IP address, application identifier or other destination indicia contained in the packet's header, firewall (or other gateway) 172 forwards the packet to destination computer 160.

Refer again to decision 340, yes branch, where the composite score of the packet is greater than or equal to the current threshold for composite score. In such a case, program 147 determines if the rate of incoming packets is greater than a rate at which IPS 140 (including program 147 and intrusion analysis engine 152) can process them (decision 350). Program 147 makes this determination by counting the number of packets which have accumulated in packet cache 149 awaiting processing by program 147.

Where IPS 140 is keeping up with the rate of incoming packets (decision 350, no branch) and does not increase the threshold for the composite score, program 147 notifies intrusion analysis engine 152 to analyze the packet for intrusions (step 360) because the composite score was found in decision 340 to be above the threshold for composite score.

If the number of accumulated packets in packet cache 149 awaiting processing is above a predetermined threshold (or if the cache 149 is filled above a predetermined percentage of its capacity) (decision 350, yes branch), then program 147 increases the threshold for the composite score (step 352). If so, statistically, program 147 will subsequently pass more packets through IPS 140 to the destination device without a time-consuming analysis by intrusion analysis engine 152. This will reduce the processing time in IPS 140 and therefore, reduce the backlog in IPS 140 and allow IPS 140 to keep up with the current rate of incoming packets.

Program 147 checks to see whether the given flow is set for catch-up mode (decision 354). If not (decision 354, no branch), program 147 notifies intrusion analysis engine 152 to analyze the packet for intrusions (step 360). If the flow is set for catch-up mode (decision 354, yes branch), program 147 checks to see whether the packet flow is greater than the threshold (decision 356). If not (decision 356, no branch), then program 147 notifies intrusion analysis engine 152 to analyze the packet for intrusions (step 360).

If the packet flow is greater than the threshold (decision 356, yes branch), then program 147 proceeds to step 358, in which program 147 unmarks the flow as catch-up mode and instead marks the flow as either auto-drop or auto-forward. If the flow was marked as auto-drop (decision 326, yes branch), all packets in the flow will be discarded (step 328). If the flow is marked as auto-forward (decision 326, no branch), process 328 will resume at step 330 and all packets in the flow will be sent in step 348.

In response to the notification from program 147, intrusion analysis engine 152 analyzes the packet for intrusions in a known manner as described above (step 360). Program 147 then determines whether the maximum time has expired (decision 362). If not (decision 362, no branch), program 147 updates the packet's flow attributes, (step 342), then proceeds to decision 344, as described above.

If maximum time has expired (decision 362, yes branch), program 147 will mark the flow as catch-up mode, auto-drop or auto-fast forward (step 364), then complete the analysis (step 366). Program 147 will then determine whether there are any packets queued for the flow (decision 370). If there are no packets queued for the flow (decision 370, no branch), then program 147 will unmark catch-up mode, then proceed to steps 342-348, as described above.

If there are packets queued for the flow (decision 370, yes branch), program 147 will then determine whether these packets have a higher priority than the new packet (decision 374). If the queued packets do not have a higher priority than the new packet (decision 374, no branch), then program 147 will set the next packet to come from the backend queue (step 376) before proceeding to steps 342-348, as discussed above. Otherwise (decision 374, yes branch), then program 147 will proceed directly to steps 342-348.

In this embodiment, packet delays through the IPS will be used as one of the parameters to score a threat. In particular, we address the situation where the overall score of the flow identifies that the packet does not pose a significant threat. In embodiments of Section I, if the packet due to network queuing times or at the end of the front end processing has already exceeded, is about to exceed, or is expected to exceed the maximum allowed delay, the packet is fast-forwarded and the flow is marked as fast-forwarded. Any packet received in the future related to a flow marked fast forwarded is also fast forwarded from there on. If the packet is not fast forwarded, it is released for backend processing that performs the deep inspections (which is typically Layer 5 and above).

The composite value may also be influenced by the depth of the packet queue associated with a flow and the mode in which the flow is operated. For example, the fact that a flow is in catch-up mode may be reflected in the composite value. Moreover, a flow that is marked AutoFastForward will never have a high composite value if the catch-up capability is enabled.

The advantages of this alternate embodiment lie in how a packet that has been initially identified as fast forward after the first phase is handled. As in the description above, the packet is forwarded to the output port to make the maximum delay. However, rather than dropping the content of the packet, the packet is also inserted into the backend processing, allowing the IPS to continue to inspect the packet, despite the fact that it has been sent to the destined endpoint. This has several benefits, for example:

(1) The IPS is theoretically able to catch up with inspection and unless the system is oversubscribed, will then be able to unmark the flow as fast forward. This in turn will reduce the number of uninspected packets and therefore reduce any potential risk that might arise from subsequent packets on this flow.

(2) Flows marked fast forward can continue to be inspected and any detected security violation can be reported. Also, in certain cases, potential threats will be detected within a certain delay allowing a blocking action to be performed preventing exploitation. As a result, the invention allows for more inspection coverage without exceeding the maximum delay.

Figure 4:
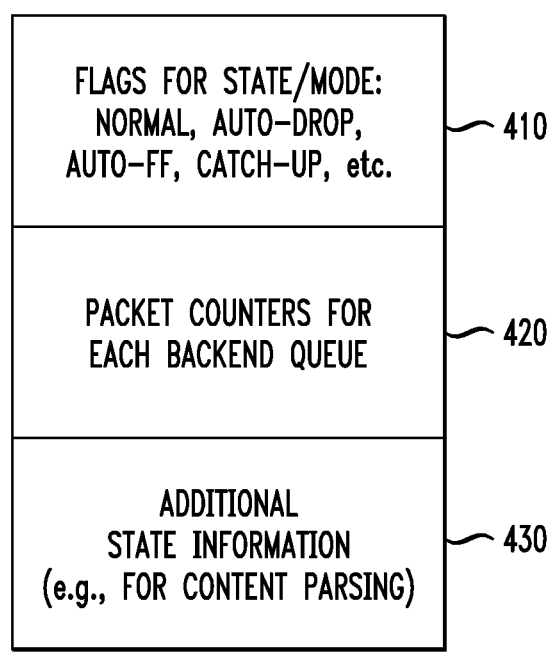
FIG. 4 illustrates an exemplary flow object suitable for use with an illustrative embodiment of the invention.

FIG. 4 shows an exemplary flow object suitable for use with an illustrative embodiment of the invention. As described in section I, the flow object is a data structure which represents a given flow. In this illustrative embodiment, flow object 400 has been expanded to include additional fields. For example, field 410 represents the state by setting condition flags for normal operation, for fast forwarding, for autodrop, and for the catch-up mode. Field 420 includes counters which indicate number of packets that are enqueued or currently processed in the backend for the flow represented by this flow object. Field 430 stores additional state information which may be required for content parsing, such as HTTP, HTML parsing, email, etc. Once the packet counter has dropped down to zero, then by definition, the inspection on this flow has caught up and if the flow was marked fast forward, it can be reset to not-fast forward. All actions but dropping the packet that are related to intrusions can be still implemented, albeit belated. Hence, this catch-up mode method provides a higher degree of protection.

In another embodiment of this invention, the parts of the deep packet inspection can be turned off selectively based on the state and time slack. This may be implemented by, for instance, augmenting the composite function so as to take the size of the packet queue for the flows into account.

In a further embodiment of this invention, packets currently related to fast forwarded flow inspection can be processed at a different priority than packets that belong to flows that are currently inspected inline (i.e., packet delivery is dependent on the outcome of the packet inspection). An exemplary technique for doing this is described above with reference to FIG. 3, and particularly step 374 thereof.

Principles described in accordance with this invention can be combined with other mechanisms and heuristics to allow fast forwarding for high fidelity connections. For instance, any spare compute capacity can still be used to inspect high fidelity connections at a low priority.

There could be a secondary time limit such as 50 milliseconds that any inspection trailing a packet that has already been forwarded is canceled. These are orthogonal to principles of this invention and those skilled in the art will fully appreciate how to integrate such mechanisms with the invention introduced above.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for intrusion protection, comprising a computing element in a network performing the steps of:
   receiving a packet of a flow, the flow comprising a plurality of packets, wherein the plurality of packets represents data in the network;
   determining a network intrusion analysis cost-benefit value of said received packet, wherein the network intrusion analysis cost-benefit value represents a benefit for analyzing said received packet for intrusions in relation to a cost for analyzing said received packet for intrusions;
   comparing said network intrusion analysis cost-benefit value to a network intrusion analysis cost-benefit threshold to determine whether analyzing said received packet for intrusions before forwarding said received packet is warranted; and
   responsive to a determination that said analyzing said received packet for intrusions before forwarding said received packet is not warranted, forwarding said received packet, indicating that subsequent packets of the flow should be forwarded, storing said received packet, and determining whether said received packet indicates an intrusion after forwarding said received packet;
   wherein said received packet comprises a destination address and wherein forwarding said received packet comprises forwarding said received packet to the destination address.

2. The method of claim 1, further comprising the step of, responsive to a determination that said analyzing said received packet for intrusions before forwarding said received packet is warranted, determining whether said received packet indicates an intrusion and, responsive to a determination that said received packet does not indicate an intrusion, forwarding said received packet.

3. The method of claim 1, further comprising the step of, responsive to a determination that said received packet indicates an intrusion, discarding said received packet and indicating that subsequent packets of the flow should be discarded.

4. The method of claim 1, wherein the step of determining whether said received packet indicates an intrusion after forwarding said received packet is performed responsive to another packet not having been received.

5. The method of claim 1, wherein said cost for analyzing said received packet for intrusions is based at least in part on a length of the flow which includes said received packet.

6. The method of claim 1, wherein said benefit for analyzing said received packet for intrusions is based at least in part on a likelihood that said received packet contains an intrusion.

7. The method of claim 1, wherein the step of comparing said value to a threshold to determine whether analyzing said received packet for intrusions before forwarding said received packet is warranted further comprises the step of determining that said computer cannot perform said steps at a rate at which packets are received for processing according to said steps, and in response, increasing said threshold.

8. The method of claim 1, wherein the step of comparing said value to a threshold to determine whether analyzing said received packet for intrusions before forwarding said received packet is warranted further comprises the step of determining that said computer can perform said steps at a substantially faster rate than which packets are received for processing according to said steps, and in response, decreasing said threshold.

9. The method of claim 1, wherein determining whether said analyzing said stored received packet for intrusions responsive to a determination that said network intrusion analysis cost-benefit value is greater than a current network intrusion analysis cost-benefit threshold.

10. A computer program product for intrusion protection, the computer program product comprising a non-transitory computer usable storage medium having computer usable program code embodied therewith, the computer usable program code comprising computer usable program code configured to perform, in a computing element of a network, the steps of:
receiving a packet of a flow, the flow comprising a plurality of packets, wherein the plurality of packets represent data in the network;
determining a network intrusion analysis cost-benefit value of said received packet, wherein the network intrusion analysis cost-benefit value represents a benefit for analyzing said received packet for intrusions in relation to a cost for analyzing said received packet for intrusions;
comparing said network intrusion analysis cost-benefit value to a network intrusion analysis cost-benefit threshold to determine whether analyzing said received packet for intrusions before forwarding said received packet is warranted; and
responsive to a determination that said analyzing said received packet for intrusions before forwarding said received packet is not warranted, forwarding said received packet, indicating that subsequent packets of the flow should be forwarded, storing said received packet, and determining whether said received packet indicates an intrusion after forwarding said received packet;
wherein said received packet comprises a destination address and wherein forwarding said received packet comprises forwarding said received packet to the destination address.

11. The computer program product of claim 10, the computer usable program code further comprising computer usable program code configured to perform the step of, responsive to a determination that said analyzing said received packet for intrusions before forwarding said received packet is warranted, determining whether said received packet indicates an intrusion and, responsive to a determination that said received packet does not indicate an intrusion, forwarding said received packet.

12. The computer program product of claim 10, the computer usable program code further comprising computer usable program code configured to perform the step of, responsive to a determination that said received packet indicates an intrusion, discarding said received packet and indicating that subsequent packets of the flow should be discarded.

13. The computer program product of claim 10, wherein the step of determining whether said received packet indicates an intrusion after forwarding said received packet is performed responsive to another packet not having been received.

14. The computer program product of claim 10 wherein said cost for analyzing said received packet for intrusions is based at least in part on a length of the flow which includes said received packet.

15. The computer program product of claim 10, wherein said benefit for analyzing said received packet for intrusions is based at least in part on a likelihood that said received packet contains an intrusion.

16. The computer program product of claim 10, wherein the step of comparing said value to a threshold to determine whether analyzing said received packet for intrusions before forwarding said received packet is warranted further comprises the step of determining that said computer cannot perform said steps at a rate at which packets are received for processing according to said steps, and in response, increasing said threshold.

17. The computer program product of claim 10, wherein the step of comparing said value to a threshold to determine whether analyzing said received packet for intrusions before forwarding said received packet is warranted further comprises the step of determining that said computer can perform said steps at a substantially faster rate than which packets are received for processing according to said steps, and in response, decreasing said threshold.

18. A computer system in a network for intrusion protection, said computer system comprising:
at least one memory; and
at least one processor coupled to the at least one memory, the at least one processor being operative to:
receive a packet of a flow, the flow comprising a plurality of packets, wherein the plurality of packets represent data in the network;
determine a network intrusion analysis cost-benefit value of said received packet, wherein the network intrusion analysis cost-benefit value represents a benefit for analyzing said received packet for intrusions in relation to a cost for analyzing said received packet for intrusions;
compare said network intrusion analysis cost-benefit value to a network intrusion analysis cost-benefit threshold to determine whether analyzing said received packet for intrusions before forwarding said received packet is warranted; and
responsive to a determination that said analyzing said received packet for intrusions before forwarding said received packet is not warranted, forward said received packet, indicate that subsequent packets of the flow should be forwarded, store said received packet, and determine whether said received packet indicates an intrusion after forwarding said received packet;
wherein said received packet comprises a destination address and wherein forwarding said received packet comprises forwarding said received packet to the destination address.

19. The computer system of claim 18, wherein the at least one processor is further operative to, responsive to a determination that analyzing said received packet for intrusions before forwarding said received packet is warranted, determine whether said received packet indicates an intrusion and, responsive to a determination that said received packet does not indicate an intrusion, forward said received packet.

20. The computer system of claim 18, wherein the at least one processor is further operative to, responsive to a determination that said received packet indicates an intrusion, discard said received packet and indicate that subsequent packets of the flow should be discarded.

21. The computer system of claim 18, wherein determining whether said received packet indicates an intrusion after forwarding said received packet is performed responsive to another packet not having been received.

\* \* \* \* \*